United States Patent [19]
Beals et al.

[11] 3,721,126
[45] March 20, 1973

[54] MEASURING PRESSURE IN A TUBULAR REACTOR FOR POLYETHYLENE

[75] Inventors: Charles D. Beals; George I. Fitzpatrick; Kim L. O'Hara, all of Baton Rouge, La.

[73] Assignee: Esso Research and Engineering Company

[22] Filed: March 19, 1971

[21] Appl. No.: 126,299

Related U.S. Application Data

[62] Division of Ser. No. 37,610, May 15, 1970, Pat. No. 3,628,918.

[52] U.S. Cl. ................................................73/388 R
[51] Int. Cl. ................................................G01l 7/00
[58] Field of Search ..........................73/388, 154 T

[56] References Cited

UNITED STATES PATENTS 3,557,620   1/1971   Jewett et al...................73/388 R Primary Examiner—Donald O. Woodiel
Attorney—Melvin F. Fincke

[57] ABSTRACT

The pressure in a tubular reactor for producing polyethylene under high pressure is measured by pumping an inert or compatible liquid with a positive displacement pump into a line connected to the reactor and maintaining said pumping at small flow rates so that some flow occurs at all times and measuring the pressure head which said pump is pumping.

1 Claim, 4 Drawing Figures

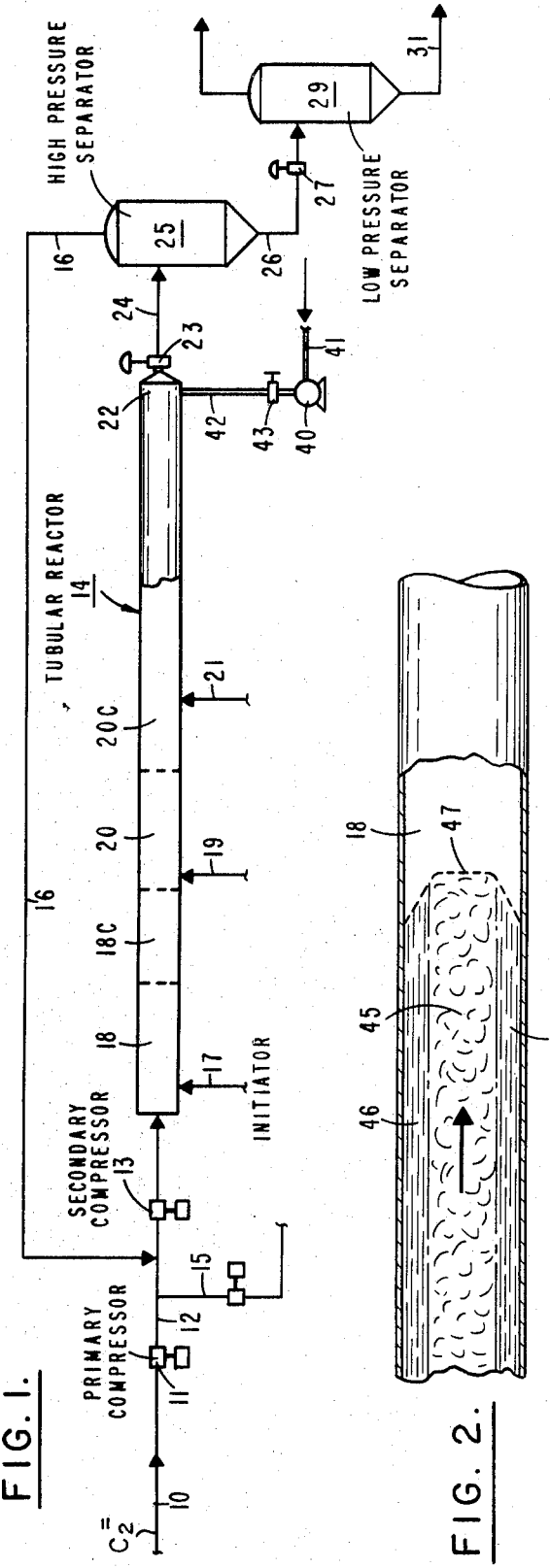
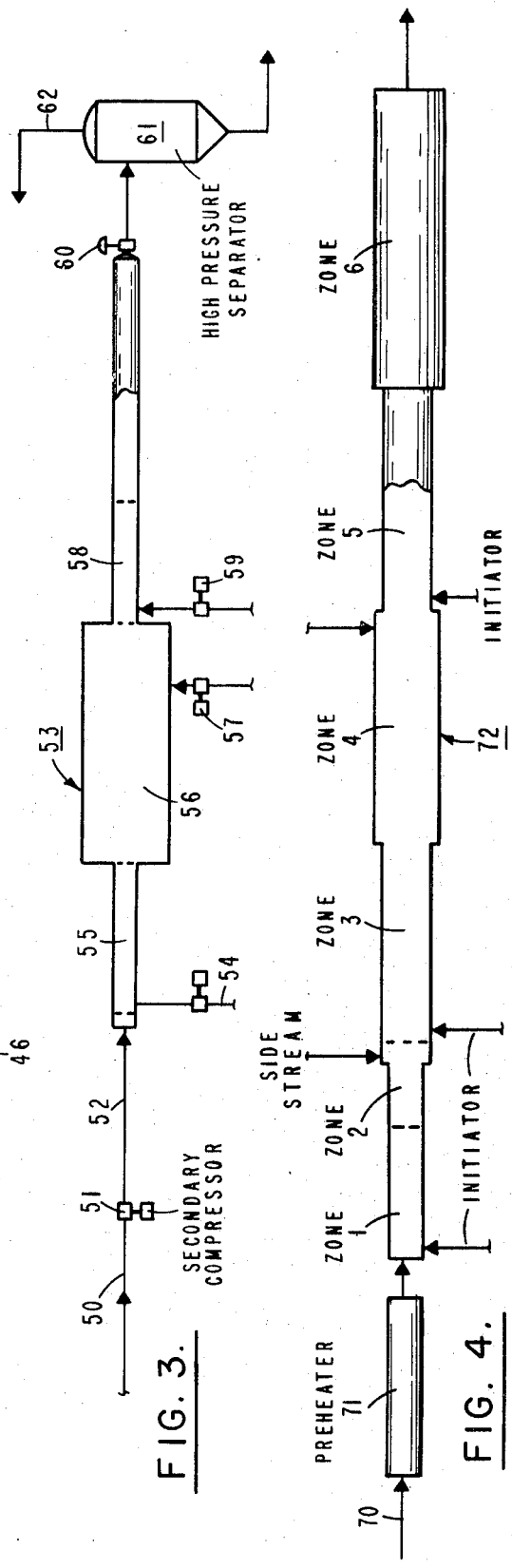

MEASURING PRESSURE IN A TUBULAR REACTOR FOR POLYETHYLENE

CROSS REFERENCE TO RELATED APPLICATION

This is a division of application Ser. No. 37,610, filed May 15, 1970 now U.S. Pat. No. 3,628,918.

BACKGROUND OF THE INVENTION

1. Field of the Invention

The present invention is directed to the polymerization of ethylene alone or with comonomers or telogens (modifiers) at elevated temperatures and pressures in an elongated tubular reactor. More particularly, the invention is directed to the production of solid polyethylene under conditions wherein the bulk fluid velocity is sufficiently high in the reaction zones of the tubular reactor so that the Flow Number in each reaction zone is greater than 3.3 ft.$^2$/sec. In its more specific aspects, the invention involves the production of high quality polyethylene under conditions wherein the bulk fluid velocity is sufficiently high so that the Flow Number in each reaction zone in the tubular reactor having internal diameter between about 0.5 and 3 inches is greater than 3.3 ft.$^2$/sec. and the effective reaction volume is increased to produce high quality polyethylene while controlling the pressure drop in the tubular reactor having at least two reaction zones so as not to exceed 6,000 and, preferably, 3,000 psi at operating pressures between 25,000 psi and 50,000 psi at the inlet of the tubular reactor as calculated or measured between the inlet of the first reaction zone and the end of the last of the reaction zones.

2. The Prior Art

The polymerization of ethylene to solid polyethylene in an elongated tubular reactor at elevated temperatures and pressures in the presence of a free radical or free oxygen yielding initiator is known. Heretofore, however, the use of high bulk fluid velocities has been carefully avoided due to the increased lengths of reaction zones thought to be necessary to accommodate the increased velocities in conventional tubular reactors. It has been understood heretofore that to provide a constant temperature rise per unit length of reaction zone in the tubular reactor, a doubling of the bulk fluid velocity would double the length of reaction zone. Hence, increasing the bulk fluid velocity in the reaction zone would necessarily increase the length thereof resulting in a much greater pressure drop occurring in the tubular reactor. In tubular reactors having one long or more than one shorter reaction zone, large pressure drops have detrimental effects on product optical property and uniformity of other physical properties since the polymer produced in the second or later portion of the reaction zone or zones are produced under lower pressures. The best film product is produced at the highest pressure. Since for practical purposes, the reaction zone must be of a finite length and increasing the length of the reaction zone increases the pressure drop, the bulk fluid velocities have not exceeded about 36 ft./sec. in a 1 inch pipe; i.e., a Flow Number of about 3.0.

SUMMARY OF THE INVENTION

The present invention may be briefly described as a process and apparatus for producing polyethylene in a tubular reactor having at least one reaction zone at elevated temperature and pressure conditions at bulk fluid velocities sufficient so that the Flow Number in each reaction zone in the tubular reactor having internal diameters between 0.5 and 3 inches is greater than 3.3 ft.$^2$/sec. Significant to the present invention is the finding that at a Flow Number greater than 3.3 ft.$^2$/sec. the reaction zones having internal diameters between 0.5 and 3 inches operate at the low end of the turbulent flow regime. This turbulent flow regime is characterized by a fully developed turbulent flow core, a buffer region and laminar flow sublayer close to the tube wall. The flow regime was found by obtaining accurate pressure drop measurements which heretofore have not been obtainable with polyethylene polymerization reactions. Another significant finding to the present invention is that the major portion of the reaction occurs in the fully developed turbulent flow core of the turbulent flow regime. Still another significant aspect of the present invention is that pressure drop may be controlled by use of side streams and/or use of larger diameter cooling tubes making up the tubular reactor. More particularly, therefore, the present invention is directed to a process and apparatus for producing polyethylene in a tubular reactor having at least one reaction zone at elevated temperature and pressure conditions at bulk fluid velocities sufficient so that the Flow Number in each reaction zone in the tubular reactor having internal diameters between 0.5 and 3 inches is greater than 3.3 ft.$^2$/sec. so that the effective reaction volume is increased while controlling the pressure drop in the tubular reactor, wherein there are more than one reaction zone, between the inlet of the first reaction zone and the end of the last of the reaction zones so as not to exceed about 6,000 psi when operating at pressures between 25,000 and 50,000 psi at the inlet of the first reaction zone.

VARIABLES OF THE INVENTION

The present invention is not limited to any specific tubular reactor design, catalyst or initiator system or temperature or pressure conditions. Accordingly, these variables, while important to any specific process or apparatus, are set forth generally as background for the the present invention.

The tubular reactor may be an elongated jacketed tube or pipe, usually in section, of suitable strength and having an inside diameter between about 0.5 to about 3 inches or more. The tubular reactor usually has a length to diameter ratio above about 100 to 1, and, preferably, having a ratio from 500 to 1 to about 25,000 to 1.

The tubular reactor is operated at pressures from about 1,000 to about 4,000 atmospheres. Pressures higher than 4,000 atmospheres may be used, but a preferred range is about 2,000 to about 3,500 atmospheres.

The temperatures employed are largely dependent on the specific catalyst or initiator system used. Temperatures may range from about 300° to about 650° F. or higher. The catalyst or initiator is a free radical initiator which may include oxygen, peroxidic compounds, such as hydrogen peroxide, decanoyl peroxide, diethyl peroxide, di-t-butyl peroxide, butyryl peroxide, t-butyl-peroctoate, di-t-butyl peracetate, lauroyl peroxide, benzoyl peroxide, T-butyl peracetate, alkyl hydroperoxides, azo compounds, such as azobisisobutyronitrile, alkali metal persulfates, perborates, and percarbonates, and oximes, such as acetoxime to mention only a few. A single initiator or a mixture of initiators may be used.

The feedstock employed in the present invention may be ethylene or predominately ethylene together with a telogen (modifier) or comonomer. Known telogens or modifiers, as the term is used herein, are illustrated by the saturated aliphatic aldehydes, such as formaldehyde, acetaldehyde and the like, the saturated aliphatic ketones, such as acetone, diethyl ketone, diamyl ketone, and the like, the saturated aliphatic alcohols, such as methanol, ethanol, propanol, and the like, paraffins or cycloparaffins such as pentane, hexane, cyclohexane, and the like, aromatic compounds such as toluene, diethylbenzene, xylene, and the like, and other compounds which act as chain terminating agents such as carbon tetrachloride, chloroform, etc. The process of the present invention may also be used to produce copolymers of ethylene with one or more polymerizable ethylenically unsaturated monomers having a

group and which undergo addition polymerization. These copolymers may be produced with or without modifiers present. Polymerizable ethylenically unsaturated monomers having a

group and which undergo addition polymerization are, for example, alpha monoolefins, such as propylene, butenes, pentenes, etc., the acrylic, haloacrylic and methacryclic acids, esters, nitriles and amides, such as acrylic acid, chloroacryclic acid, methyacrylic acid, cyclohexyl methacrylate, methyl acrylate, acrylonitrile, acrylamide; the vinyl and vinylidene halides; the N-vinyl amides; the vinyl carboxylates, such as vinyl acetate; the N-vinyl aryls, such as styrene; the vinyl ethers, ketones or other compounds, such as vinyl pyridine, and the like. Comonomers and telogens or modifiers are used to modify the properties of the ethylene polymer produced. Accordingly, the term polyethylene, as used herein, is meant to include the so modified ethylene polymers as well as homopolyethylene.

BRIEF DESCRIPTION OF DRAWINGS

The present invention will be further illustrated by reference to the drawings in which:

FIG. 1 is a flow diagram of a constant diameter tubular reactor having two reaction zones for the polymerization of ethylene;

FIG. 2 is an illustration in cross section of the flow regime through a reaction zone of a tubular reactor according to the present invention;

FIG. 3 is a flow diagram of a tubular reactor having two reaction zones and a cooling zone of increased diameter; and FIG. 4 is an illustration of a tubular reactor having three reaction zones according to this invention and provided with side streams and different diameter tubes to provide high conversion, increased effective reaction volume, i.e., reaction zone boundary layer control and pressure drop control.

DESCRIPTION OF THE PREFERRED EMBODIMENTS

The present invention may be illustrated by referring to FIG. 1 of the drawings which illustrate a tubular reactor of constant diameter having two reaction zones. Referring to FIG. 1, numeral 10 designates a feed line for introducing ethylene from a source (not shown) into a primary compressor 11. The ethylene feed which may also include modifiers or comonomers is then fed through line 12 to secondary compressor 13. In secondary compressor 13, the feed gases are compressed for introduction into the tubular reactor 14 at temperature and pressure conditions such that the gases are at supercritical conditions. Modifiers or comonomers may be introduced into line 12 through line 15 and, in addition, recycle gases may be introduced into line 12 through line 16 before secondary compressor 13. The compressors illustrated in FIG. 1 may be a single compressor or two or more in series or parallel. The side streams or recycle streams may use separate compressors or lines from the primary or secondary compressors.

The feed stream, after being introduced into tubular reactor 14, comes into contact with an initiator introduced through line 17 whereby a reaction occurs in reaction zone 18. The tubular reactor 14 is jacketed along essentially its entire length with heat exchange media in the jacket to provide cooling for the highly exothermic reaction. After a maximum temperature is reached in the reaction zone, the reaction mixture cools in cooling zone 18 C. Additional initiator may be added through line 19 to provide a second reaction zone 20 wherein again a maximum temperature is reached followed by cooling in cooling zone 20 C. The tubular reactor 14 is illustrated having two reaction zones; however, if additional reaction zones are desired, additional initiator may be added by lines, such as line 21. At the end 22 of tubular reactor 14, the reaction mass is discharged through a pressure let down valve 23 into line 24 which leads to a high pressure separator 25.

In the high pressure separator 25, unreacted ethylene, modifiers and/or comonomers are separated and recycled through line 16. The gases are appropriately cooled and wax separated (not shown) before recycled to line 12. The polymer is removed from the bottom of the high pressure separator 25 through line 26 wherein it may pass through a second let down valve 27 and through line 28 into a low pressure separator 29.

In low pressure separator 29, gases are removed through line 30. The desired polyethylene is removed through line 31 to be finished in a conventional manner.

In arriving at the present invention, a significant aspect was the ability to measure the pressure drop in the tubular reactor 14. This was accomplished as illustrated in FIG. 1 by having a positive displacement pump 40 pump against the head at the end 22 of the tubular reactor 14. Hexane was pumped in very small amount, less than 1 gallon per hour, through line 42 having a check valve 43 therein. Instead of hexane, any inert and/or compatible fluid with the polymer produced may be used. THe positive displacement pump 40 having a pressure rating of about 60,000 psi had a pressure gauge (not shown) thereon. As the hexane was pumped through line 42, the pressure therein was the same as the pressure at the end 22 of tubular reactor 14 and at any point in time was shown on the pressure gauge as the head against which the pump 40 was pumping. By this technique, pressure measurements were obtained which heretofore were unobtainable, because of difficulties such as plugging caused by the presence of the polymer in attempting to use conventional pressure measuring devices, such as a gauge or strain gauge devices. As the let down valve 22 opened under the normal pulsing or bumping cycle, hexane continued to flow in line 42 which prevents plugging therein and provides accurate pressure measurements.

The following experimental data was obtained in a constant diameter tubular reactor such as illustrated in FIG. 1. The results of the experimental runs are set forth in Table I below. The experimental runs were at differing bulk flow velocities and a startling result was found that higher bulk fluid velocities than previously employed were desirable to produce uniform, improved product. This was particularly so since the additional reaction volume required at higher bulk fluid velocities, normally considered in terms of additional length of tubular reactor, was obtained in reaction zone lengths essentially that used at much lower bulk fluid velocities. To express the present invention, a critical bulk flow velocity could not be defined since it would be meaningful only for a specific diameter tube or pipe. In other words, the numerical value of the bulk fluid velocities which are necessary to obtain the results of the present invention would be different for each diameter pipe used in a tubular reactor. Accordingly, the term Flow Number is used herein to express the nature of the flow regime in a tubular reactor according to the present invention. Flow Number is defined as the bulk fluid velocity in ft./sec. times the diameter in feet. In the following table, a comparison is given among runs at different bulk flow velocities and at approximately the same conversions, in a tubular reactor of one inch inside diameter.

TABLE I

| V | FN | ΔP | MI | Haze | Gloss |
|---|----|----|----|------|-------|
| 35.7 | 3.0 | 1916 | 2.1 | 6.8 | 9.3 |
| 48.8 | 4.1 | 3332 | 2.4 | 5.2 | 10.4 |
| 64.1 | 5.3 | 5200 | 2.2 | 6.0 | 9.5 |

In the above table, V is bulk fluid velocity in ft./sec. FN is Flow Number and MI is melt index. The pressure drop (ΔP) is that obtained by calculation from the measured pressure drop between the inlet and outlet of the tubular reactor for that portion of the tubular reactor between the inlet to the reactor and the end of the last reaction zone. It is this ΔP which is meaningful to produce quality since no further reaction occurs and, accordingly, the pressure drop occurring in the last cooling zone is simply a matter of choice.

It can be seen from Table I that an improved film product is made at the higher Flow Numbers in that the haze is lower and gloss higher. The pressure drop is shown to have an effect on product quality since at the larger pressure drops, the pressure in the second reaction zone is much lower than in the first reaction zone and, accordingly, the polymer produced therein is different.

It was found in analyzing the data from the experimental runs that the flow regime of the reaction mixture in the reaction zones of the tubular reactor was no longer in the higher portion of laminar flow, but in a partially turbulent flow regime. Hence, in calculating a friction factor (f) using the fundamental equations relating to flow of fluids in a pipe, the friction factor was proportional to the Reynolds number to the $-\frac{1}{4}$ power. Significantly, this determination led to the present invention, wherein bulk fluid velocities should be increased in the polymerization of polyethylene sufficiently to provide in the reaction zones of tubular reactors having internal diameters between 0.5 and 3 inches, a Flow Number greater than 3.3 ft.$^2$/sec. The nature of the flow regime in the reaction zones of the tubular reactor is illustrated in FIG. 2. The partially turbulent flow regime in reaction zone 18, for example, comprises a fully turbulent flow core 45, a buffer region (not shown) and a laminar flow sublayer 46. The line 47 represents the velocity profile and indicates that the velocity in the turbulent flow core 45 is greater than in the laminar flow sublayer 46. More significantly, however, now knowing the nature of the flow regime at these bulk fluid velocities, it was concluded that even greater bulk fluid velocities for maximum turbulent volume were desired. To substantiate this conclusion, the effective volume of the turbulent flow core 45 and the percentage of the thickness of the laminar flow boundary layer 46 were calculated. The results are shown in Table II using the data obtained in the same runs set forth in Table I.

TABLE II

| FN | Effective Volume (% Total Volume) | Laminar Thickness (% of Tube Diameter) |
|----|-----------------------------------|----------------------------------------|
| 3.0 | 52 | 29 |
| 4.1 | 67 | 22 |
| 5.3 | 74 | 18 |

Concluded from the data were the following: that the major portion of the reaction occurs in the turbulent flow core 45, that the boundary layer thickness or percentage of laminar thickness should be minimized to increase effective reaction volume, that a more uniform product is produced at increased effective volumes, that the bulk fluid velocities should be increased over any presently used and sufficient to produce a Flow Number greater than 3.3 ft.$^2$/sec., preferably greater than 3.5 ft.$^2$/sec., and suitably in the range of 4 to 10 ft.$^2$/sec. for reaction zones in tubular reactors having diameters between 0.5 and 3 inches, and that pressure drop should be controlled in tubular reactors having more than one reaction zone to less than about 6,000 psi and, preferably, less than 4,000 psi at inlet pressures between 25,000 and 50,000 psi since large pressure drops between reaction zones affect product quality and uniformity.

To illustrate the operability at vary high Flow Numbers, an experimental run was made in a one inch internal diameter tubular reactor. Only one reaction zone was used due to limited heat transfer surface in the reactor. The results are set forth in Table III. Pressure drop at this flow rate would have prohibited production of high quality film product if a second reaction zone were added.

TABLE III

| V | FN | ΔP | MI | Haze | Gloss |
|---|---|---|---|---|---|
| 91.5 | 7.6 | 9666 | 1.6 | 5.8 | 9.8 |

It may be concluded from the foregoing data in Tables I and III that a Flow Number greater than 3.3 ft.$^2$/sec. produces an improved product, but that pressure drop must be controlled if a second reaction zone is used to obtain improved quality film product. Accordingly, one aspect of the present invention is to control the pressure drop in tubular reactors for producing polyethylene by using either side stream injection or larger diameter cooling tubes, or both. This aspect of the present invention is illustrated with reference to FIG. 3, wherein ethylene either alone or together with modifiers and/or comonomers is introduced by line 50 into secondary compressor 51. The gases are then introduced by line 52 into a tubular reactor 53 having initial tubes of a particular diameter. Initiator is introduced through line 54 into the initial portion of the tubular reactor wherein reaction occurs in zone 55. At that point in the tubular reactor 53, where the temperature reaches a maximum, and cooling begins, tubes of a larger diameter are used to provide a cooling zone 56. In addition, if desired, cooling media may be introduced through side stream 57. The cooling media may be ethylene, modifier, comonomer, an inert diluent or combinations thereof. After the reaction mixture passes through the cooling zone 56 of the tubular reactor 53, the mixture is introduced into a second reaction zone 58 wherein additional initiator is introduced by line 59, if not already introduced in line 57. The reaction mixture is then passed through the tubular reactor 53 and through let down valve 60. The reaction mixture is then separated in a separator 61 in a conventional manner with the gases being recycled through line 62 and the polymer product passing through line 63. According to the present invention, cooling tubes of larger diameter are used between reaction zones 55 and 58 to provide a lower pressure drop between reaction zones because of the shorter length of tube required. Furthermore, a side stream 57 may be provided to aid in cooling which will also reduce the length of the cooling zone required and the pressure drop between reaction zones. By either or both of these means, the bulk fluid velocities may be increased over presently used velocities sufficiently to produce Flow Numbers greater than 3.3 ft.$^2$/sec., preferably 3.5 ft.$^2$/sec. or more, in each reaction zone having an internal diameter between 0.5 and 3 inches so as to increase the effective reaction volume or the volume of the turbulent flow core while producing a higher quality product. By controlling the pressure drop to less than 6,000 psi, preferably less than 4,000 psi, between the inlet of the tubular reactor having a pressure between 25,000 and 50,000 psi and the end of the last reaction zone in the tubular reactor, high quality film product may be produced.

To illustrate the present invention in all of its aspects, a tubular reactor for the production of polyethylene is illustrated in FIG. 4. The feed gases are introduced by line 70 to a preheater 71 to be heated before introduction into the jacketed tubular reactor 72. The tubular reactor 72 has six zones including three reaction zones and three cooling zones. Initiator is introduced into reaction zones 1, 3, and 5, while side streams for cooling and reducing pressure drop are introduced into cooling zones 2 and 4. The following Table IV sets forth the internal diameter of the tubes in each zone, the bulk fluid velocities in each zone and the Flow Number in each reaction zone for a particular design. In any particular design, the first reaction zone may have an internal diameter between 0.5 and 2.5 inches.

TABLE IV

| | Internal Diameter (Inches) | Bulk Fluid Velocity (Ft./Sec.) | FN |
|---|---|---|---|
| Zone 1 | 1 | 52.5 | 4.37 |
| Zone 2 | 1 | 52.5 | — |
| | 1.25 | 56.4 | — |
| Zone 3 | 1.25 | 56.4 | 5.87 |
| Zone 4 | 1.50 | 39.2 | — |
| Zone 5 | 1.25 | 79.0 | 8.23 |
| Zone 6 | 1.50 | 55.0 | — |

The pressure drop in the tubular reactor 72 having the foregoing dimensions would be less than 2,500 psi between the inlet to zone 1 and the end of zone 5 at inlet pressures in excess of 35,000 psi. The two different diameters for the first cooling zone 2 illustrates that maintaining the same internal diameter tubes for a certain length to provide cooling before increasing the internal diameter is within the present invention and is a matter of design. For example, all of cooling zone 2 may be 1.25 inches internal diameter. However, it is desirable to introduce the side stream to the larger diameter tube. The length of the cooling zone in the larger diameter tube may be very short (less than 50 ft.) before another reaction is initiated by introduction of initiator. While various design changes may be made, according to the present invention, the important feature is that the bulk fluid velocities in each reaction zone are sufficient to provide a Flow Number greater than 3.3 ft.$^2$/sec. Further, it is desirable to have larger Flow Numbers in each successive reaction zone so as to provide greater effective reaction volumes to offset the effect of having polymer in the reaction mass in the subsequent reaction zone. With the tubular reactor 72, illustrated with the foregoing dimensions, the effective reaction volume is 64 percent in zone 1, 72 percent in zone 3, and 84 percent in zone 5. Since essentially no reaction is occurring in the cooling zones 2, 4, and 6, the flow regime is not critical to the kind of product produced and, accordingly, much lower bulk fluid velocities in the larger diameter cooling tubes may be used. The larger diameter tubes provides additional heat transfer surface as well as reduces overall pressure drop.

In summary, the present invention is directed to a process for producing polyethylene in reaction zones having internal diameters between 0.5 and 3 inches at bulk fluid velocities sufficient so that the Flow Number is greater than 3.3 ft.$^2$/sec. in each reaction zone.

Preferably, tubular reactors having at least two reaction zones or more are used and the Flow Number in each successive reaction zone will be equal to or, preferably, higher than the reaction zone it follows. Further, in tubular reactors having at least two reaction zones, the pressure drop between the inlet of the tubular reactor and the end of the last reaction zone is controlled to less than 6,000 psi, preferably 4,000 psi when the inlet pressures are between 25,000 and 50,000 psi. The control of pressure drop is accomplished by side stream injection and/or larger diameter tubes in the cooling zones.

The nature and object of the present invention having been completely described and illustrated and the best mode contemplated set forth, what we wish to claim as new and useful and secure by Letters Patent is:

1. A method for measuring the pressure in a tubular reactor for producing polyethylene under high pressure conditions which comprises:

pumping an inert or compatible liquid with a positive displacement pump into a line connected to said tubular reactor, maintaining said pumping at small flow rates so that some flow occurs within said line at all times, and measuring the pressure head against which said positive displacement pump is pumping.

* * * * *